2,994,705
PREPARATION OF CYCLIC ALKYLENE CARBONATES IN THE PRESENCE OF ORGANIC PHOSPHONIUM COMPOUNDS

Gifford W. Crosby, River Forest, and Allen F. Millikan, Crystal Lake, Ill., assignors to The Pure Oil Company, Chicago, Ill., a corporation of Ohio
No Drawing. Filed Dec. 8, 1958, Ser. No. 778,562
9 Claims. (Cl. 260—340.2)

This invention relates to an improved process for the production of alkylene carbonates by the reaction of oxirane compounds such as alkylene oxides, including ethylene and propylene oxides, for example, with carbon dioxide at elevated temperatures and pressures. More particularly, this invention relates to processes for the production of alkylene carbonates from oxirane compounds wherein a catalyst is employed for promoting the reaction.

Ethylene oxide has been prepared from ethylene glycol by reaction with phosgene. The reaction of alcohols with phosgene produces the corresponding alkyl carbonate. Also, ethylene chlorohydrin, when reacted with alkali metal carbonates or bicarbonates, produces ethylene carbonate. Several research workers have suggested catalysts for the reaction of oxirane compounds with carbon dioxide. Such catalysts as sodium hydroxide on activated carbon, pyridine, and amines have been included in this work. These prior art methods are deficient for a number of reasons, including the danger of explosions, poor yields, or contaminated products.

It is an object of the invention to provide a catalytic process for producing alkylene carbonates by the reaction of oxirane compounds with carbon dioxide wherein the reaction is facilitated, product purity is improved, and yields are increased.

It is another object of the invention to provide a process for the preparation of alkylene carbonates from oxirane compounds by catalytic reaction with carbon dioxide in the presence of organic phosphonium compounds.

A further object of this invention is to provide a process for the production of alkylene carbonates from alkylene oxides through reaction with carbon dioxide in the presence of organic phosphonium salts using a small amount of said catalyst.

Other objects and features of this invention will be apparent from the following description.

In accordance with this invention, the alkylene oxides which are reacted with carbon dioxide are those of the oxirane system and have the general structural formula:

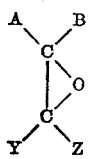

in which A, B, Y and Z represent hydrogen or hydrocarbyl groups containing from 1 to 20 carbon atoms, and in which any two of the groups A, B, Y and Z may be interconnected to form, with one or two of the carbon atoms shown in the formula, a carbocyclic ring. The reaction with carbon dioxide may be shown as follows:

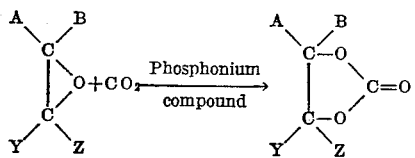

The organic phosphonium compound or phosphonium salt used as a catalyst has the general formula,

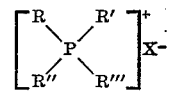

wherein R, R′, R″ and R‴ are the same or different hydrocarbyl radicals containing up to 20 carbon atoms, and X is a halogen such as iodine, bromine, chlorine, and fluorine.

Suitable oxirane compounds to be used as the beginning reactant of this invention include ethylene oxide, cyclohexylethylene oxide, propylene oxide, cyclohexene oxide, 1,2-epoxybutane, 2,3-epoxybutane, cyclopentene oxide, 1,2-epoxyhexane, epoxyisobutylene, 1,2-epoxyhexadecane, epoxycyclohexane, styrene oxide, cycloheptene oxide, methylenecyclohexane oxide, and similar compounds having a three-membered oxirane ring.

Specific examples of catalysts for the reaction comprise the class of phosphonium salts coming under the above formula to include tetramethylphosphonium bromide, diethyldiamylphosphonium iodide, tetraphenylphosphonium bromide, tri-n-propylbenzylphosphonium chloride, tri-3,5-xylyl-1-naphthylphosphonium bromide, etc. These phosphonium salts are crystalline solids or viscous oils at room temperature and can be prepared by the alkylation of phosphines and by other methods known in the art.

The amount of catalyst required to carry out the process of this invention depends somewhat on the reaction conditions but usually are within the limits of about 0.001 to 10% by weight, based on the amount of oxirane reactant. The catalyst concentration will vary as different temperatures, catalysts, contact times and pressures are used. Also, the solubility of the catalyst in a diluent or carrier for the reaction may vary. The catalyst may be dissolved in the oxirane reactant, or in a diluent, or it may be placed directly in the reaction zone by suitable means for controlling the amount added. In certain instances it is undesirable to contact the catalyst with the oxirane compound in the absence of the carbon dioxide because this tends to promote side reactions and decreased yields of the desired glycol carbonates or alkylene carbonates.

This is a type of reaction wherein an induction period is often experienced in starting the reaction, particularly in the absence of a diluent, and this condition may require the use of more catalyst. Induction periods may be reduced by adding to the reactant mass a small amount of the glycol carbonate product.

The reaction is carried out at a temperature of about 200° F. to 500° F. and preferably from about 300° to 450° F., under a pressure of about 100 p.s.i.g. to 1000, or as high as 3000 p.s.i.g. The reaction may be conducted either batchwise or continuously and in the presence or absence of an inert diluent. The catalyst may be continuously introduced in solution form, along with the carbon dioxide and oxirane compound under the desired reaction conditions, into an elongated reaction zone. Under these conditions, the products may be withdrawn from the effluent at the opposite end of the reaction zone. Preferred diluents or solvents for the reaction include dioxane, benzene, and crude glycol carbonates. In using a batchwise operation, portions of the oxirane compounds and the catalyst are introduced into a pressure-type reactor, carbon dioxide is introduced in amounts sufficient to build up the desired pressure, and the reaction mixture is agitated during the application of heat. In general, the reaction may be completed in about ½ hour to about 5 hours.

The proportions of oxirane compound and carbon dioxide are generally adjusted so as to provide an excess of carbon dioxide over the stoichiometric amount thereof required to react with all of the oxirane compound. The excess of carbon dioxide will, in general, vary from about 1% to 300%. In any event, it is necessary to avoid using an excess of oxirane compound, since these compounds tend to polymerize under pressures and may create an explosion hazard.

The invention is illustrated by the following specific examples:

Example I

Exactly 0.18 g. of triphenylethylphosphonium iodide and 17.6 g. of ethylene oxide were chilled to −20° F. and charged to an autoclave of 100 ml. volume. Carbon dioxide gas was then admitted to the autoclave until the pressure reached 500 p.s.i.g., with agitation by rocking. Heat was applied at a rate which raised the temperature to 430° F. in 40 minutes. This temperature was maintained for 4 hours, and the autoclave was rocked throughout the period. At the end of this time, the pressure was approximately 1200 p.s.i.g. There was a yield of crude crystalline product of 32.4 g. (91% based on the ethylene oxide charged). Recrystallization from toluene gave a product melting at 95–97° F. No melting point depression was observed for a mixture with known ethylene carbonate.

Example II

Exactly 0.18 g. of methyltri-n-butylphosphonium iodide and 17.4 g. of ethylene oxide (chilled to −20° F.) were charged to an autoclave of 100 ml. volume. Carbon dioxide was then charged to the autoclave until the pressure reached 450 p.s.i.g., with agitation by rocking. Heat was applied at a rate which raised the temperature of the autoclave to 340° F. in 45 minutes. This temperature was maintained for 4.5 hours with rocking throughout the time. At the end of the reaction period, the pressure was approximately 1000 p.s.i.g. There was a yield of 32.0 g. of crystalline product that was essentially all ethylene carbonate. This represented a yield of 92% (based on the ethylene oxide charged).

Example III

Exactly 0.18 g. of ethyltri-n-butylphosphonium bromide and 16.9 g. of ethylene oxide (chilled to −20° F.) were charged to an autoclave of 100 ml. capacity. Carbon dioxide was charged until the pressure reached 440 p.s.i.g., with agitation by rocking. Heat was applied at a rate that brought the temperature of the autoclave to 335° F. in 30 minutes. This temperature was maintained for 3.5 hours with agitation by rocking. At the end of the reaction period, the pressure was approximately 1000 p.s.i.g. There was 30.5 g. of crystalline product that was essentially all ethylene carbonate. This represented a yield of 93% (based on the ethylene oxide charged).

Example IV

The reaction described in Example I was carried out without using a phosphonium catalyst. The yield of ethylene carbonate was less than 1%.

Example V

The process of Example III is repeated using diethyldiamylphosphonium iodide as a catalyst. The yield of ethylene carbonate is of the order of 90%.

Example VI

The process of Example II is repeated using diethyldiamylphosphonium iodide with propylene oxide. A good yield of propylene carbonate is recovered.

The reaction of this invention to produce cyclic alkylene carbonates or glycol carbonates and, more specifically, ethylene carbonate or 1,3-dioxolane-2-one may be carried out with or without a diluent which is non-reactive and acts to aid in temperature control. Such diluents as aromatic hydrocarbons, benzene, crude cyclic alkylene carbonates, or dioxane may be used. The reaction may be conducted in any suitable pressure vessel of the various types known to the art. The reactants may be brought together in any order and it is desirable that an excess of carbon dioxide be used to avoid polymerization.

The crude alkylene carbonates obtained may be purified by stripping off any low-boiling compounds. The phosphonium compound may be removed by extraction or precipitation. The glycol carbonate may be purified by distillation under reduced pressure.

The organic phosphonium compounds used in accordance with this invention are well known and are described in chapter 5 of "Organophosphorus Compounds," Kosolapoff, Wiley, 1950. Being quaternary compounds, they are formed by many different reactions, including the addition of alkyl halides to tertiary phosphines, reaction of tertiary phosphines with Grignard reagents, heating mercury phosphide with alkyl iodides, etc. Other specific examples include tetramethylphosphonium iodide, tetramethylphosphonium fluoride, tetramethylphosphonium chloride, tetraethylphosphonium bromide, tetraethylphosphonium iodide, tetraethylphosphonium chloride, tetraethylphosphonium fluoride, tetrabutylphosphonium iodide, tetraisobutylphosphonium iodide, tetraisobutylphosphonium chloride, trimethylethylphosphonium iodide, trimethylethylphosphonium chloride, trimethylethylphosphonium bromide, trimethylethylphosphonium fluoride, diethyldiamylphosphonium bromide, trimethylisoamylphosphonium iodide and chloride, trimethylphenylphosphonium iodide, trimethylbenzylphosphonium bromide and iodide, trimethyl-2,4-dimethylphenylphosphonium iodide and chloride, trimethyl-3,5-dimethylphenylphosphonium iodide, trimethyl-2,5-dimethylphenylphosphonium iodide, triethylmethylphosphonium iodide, chloride, and bromide, dimethylethylphenylphosphonium iodide, and diethylmethylphenylphosphonium iodide.

Also included are quaternary phosphonium halides of the type having other combinations of alkyl groups, aromatic groups, substituted-aromatic and related groups. Such compounds include dimethyldiethylphosphonium iodide and chloride, dimethyldiphenylphosphonium iodide and fluoride, di-isobutyldiphenylphosphonium iodide, methylethylisopropylisobutylphosphonium iodide and chloride, phenyl-ethyl-tetramethylenephosphonium iodide, phenyl-propyl-tetramethylenephosphonium iodide and p-tolyl-ethyl-pentamethylenephosphonium iodide.

Ethylene carbonate, one of the species within this invention, melts at about 97° F. and has a boiling point of about 478° F. at 760 mm. Hg. Although ethylene carbonate is useful in syntheses, the compound has good solvent properties for such substances as polyvinyl chloride and polyacrylonitrile. Ethylene carbonate has been used as a solvent for the extraction of aromatic hydrocarbons from mixtures containing same. It is also used as a source of carbon dioxide and as a stabilizer in ester-type synthetic lubricating oils.

Propylene carbonate is a liquid, melting at about −56° F. and having a boiling point of about 467° F. at 760 mm. Hg. Propylene carbonate is relatively stable at elevated temperatures. In general, it undergoes the same reactions as ethylene carbonate, e.g., the carbon-oxygen cleavage and ester interchanges.

What is claimed is:

1. The process for producing alkylene carbonates which comprises reacting an alkylene oxide of the oxirane system with carbon dioxide at temperatures of about 200° F. to 500° F. and pressures above about 100 p.s.i.g. in the presence of a phosphonium compound of the formula

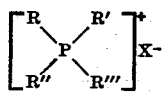

wherein R, R', R" and R'" are hydrocarbon radicals containing up to 20 carbon atoms and X is a halogen selected from the group consisting of chlorine, bromine and iodine.

2. The process in accordance with claim 1 in which the alkylene oxide is selected from the group of ethylene oxide, cyclohexene oxide, propylene oxide, butylene oxide, styrene oxide, diphenylethylene oxide, 1,2-epoxybutane, 2,3-epoxybutane, 1,2-epoxyhexane, epoxyisobutylene, 1,2-epoxyhexadecane, cyclopentene oxide, and methylenecyclohexane oxide.

3. The process in accordance with claim 1 in which the phosphonium compound is selected from the group of tributylmethylphosphonium iodide, tetramethylphosphonium bromide, diethyldiamylphosphonium iodide, tetraphenylphosphonium bromide, tri-n-propylbenzylphosphonium chloride, tri-3,5-xylyl-1-naphthylphosphonium bromide, tributylethylphosphonium bromide, ethyltriphenylphosphonium iodide, methylethylisopropylisobutylphosphonium iodide and p-tolyl-ethylpentamethylenephosphonium iodide.

4. The method in accordance with claim 1 in which between about 0.001 and 10% by weight of said phosphonium compound is used, based on the weight of said alkylene oxide.

5. The process in accordance with claim 1 in which an excess of about 1% to 300% of said carbon dioxide is present over stoichiometric amounts based on said alkylene oxide.

6. The process of producing ethylene carbonate which comprises reacting ethylene oxide with carbon dioxide at a temperature of about 200° to 500° F. and a pressure of above about 100 p.s.i.g. in the presence of about 0.001 to 10% by weight of ethyltriphenylphosphonium iodide based on the amount of said ethylene oxide.

7. The process of producing ethylene carbonate which comprises reacting ethylene oxide with carbon dioxide at a temperature of about 200 to 500° F. and a pressure of above about 100 p.s.i.g. in the presence of about 0.001 to 10% by weight of tributylmethylphosphonium iodide based on the amount of said ethylene oxide.

8. The process of producing ethylene carbonate which comprises reacting ethylene oxide with carbon dioxide at a temperature of about 200 to 500° F. and a pressure of above about 100 p.s.i.g. in the presence of about 0.001 to 10% by weight of diethyldiamylphosphonium iodide based on the amount of said ethylene oxide.

9. The process of producing propylene carbonate which comprises reacting propylene oxide with carbon dioxide at a temperature of about 200 to 500° F. and a pressure of above about 100 p.s.i.g. in the presence of about 0.001 to 10% by weight of diethyldiamylphosphonium iodide based on the amounts of said propylene oxide.

References Cited in the file of this patent
UNITED STATES PATENTS

| | | |
|---|---|---|
| 2,667,497 | Cline | Jan. 26, 1954 |
| 2,773,070 | Lichtenwalter | Dec. 4, 1956 |